Nov. 25, 1969   L. ALLIOT ET AL   3,480,419
GASIFICATION OF HYDROCARBONS
Filed July 20, 1966   3 Sheets-Sheet 3

FIG. 4.

United States Patent Office 3,480,419
Patented Nov. 25, 1969

3,480,419
GASIFICATION OF HYDROCARBONS
Louis Alliot, Rouen, and Michel Auclair and Francois Godouet, Mont-Saint-Aignan, France, assignors to Esso Standard Societe Anonyme Francaise, Paris, France, a corporation of France
Filed July 20, 1966, Ser. No. 566,685
Claims priority, application France, July 27, 1965, 26,227; Apr. 29, 1966, 59,781
Int. Cl. C10k 3/06
U.S. Cl. 48—212                          9 Claims

ABSTRACT OF THE DISCLOSURE

Hydrocarbons are gasified in a reaction zone to produce a combustible gas mixture having a calorific value between 800 and 3000K calories per cubic meter minimum free carbon formation by continuously reacting the hydrocarbons and recycling part of the combustible gas product, mixing the recycled product with free oxygen-containing gases and returning them to the hydrocarbon reaction zone.

---

Figure 1:
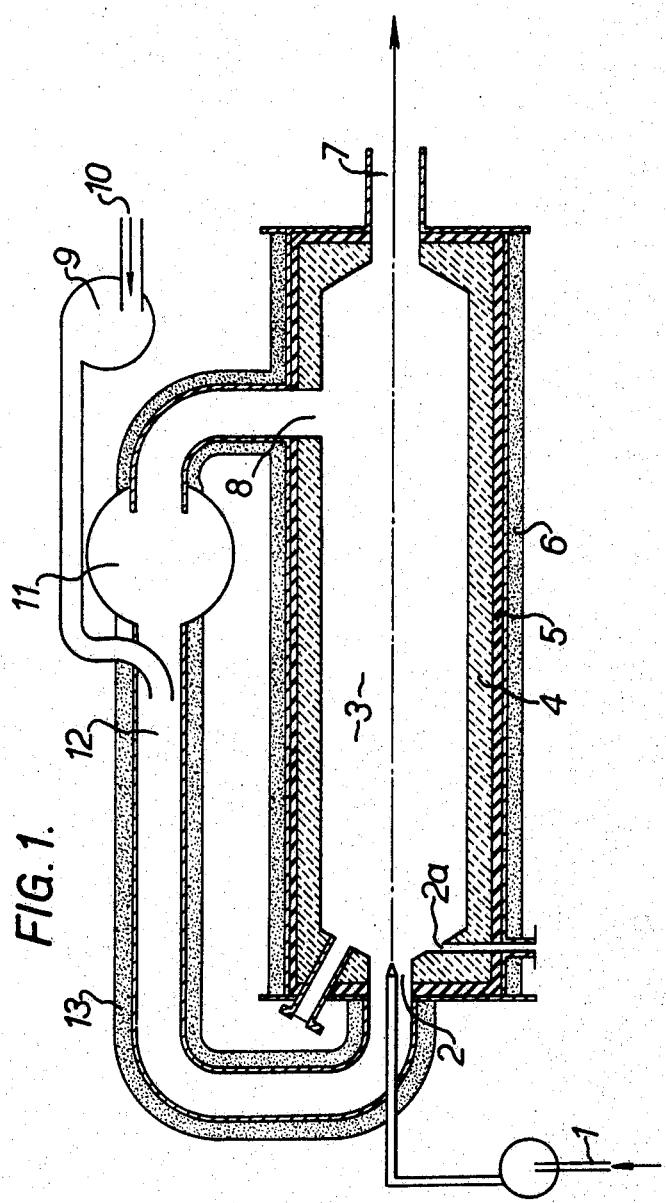

This invention relates to a method of and means for the gasification of liquid hydrocarbons to produce combustible gas mixtures.

Gasifiers are known in which hydrocarbons are burned to produce a combustible gas mixture consisting mainly of carbon dioxide, carbon monoxide, hydrogen, nitrogen, hydrocarbons and water vapour. Such gas mixtures, which have a low calorific value, are used for firing industrial furnaces in a wide range of industries. However, the gas mixtures produced from hydrocarbons using previously known processes and apparatus, contain amounts of carbon which, although not high, can be excessive, and, often, of other undesirable impurities such as tars and inorganic residues; part of this material can be burnt in subsequent uses of the gas mixture but the carbon, or other impurities, have many disadvantages such as fouling the gasifier, accelerating corrosion and even of making the gas mixture unsuitable for certain uses where a clean gas is required, for example in the food, glass, ceramics and lime industries.

It is an object of the present invention to minimise the formation of carbon and other undesirable impurities in combustible gas mixtures produced by the gasification of hydrocarbons.

In the invention hydrocarbons are converted and part of the gaseous mixture produced in the gasifier is recycled, a free oxygen containing gas or gas mixture usually air, oxygen enriched air, or oxygen, being admitted into that portion of the gas mixture geing recycled, during most of the process, in an amount less than the stoichiometric requirement for complete combustion of the gas mixture. The oxygen containing gas may, if desired, be admitted in a heated state and, in this case, the sensible heat of the gas mixtures produced in the gasifier may be used to preheat the oxygen containing gas. The recycled gas or gas mixture is used in the conversion of liquid hydrocarbons being fed continuously to the gasifier. Although the invention is applicable to the conversion of liquid hydrocarbons generally, from low boiling products, such as light virgin naptha, to high boiling fractions it is particularly suitable for the gasification of heavy fuel oils, such as residual fuel oils, and a typical gas mixture produced by the process of the invention may have a calorific value of between 800 and 3000 kcal./Nm.³ (Nm.³=cubic metres at standard temperature and pressure), at a temperature of between 500 and 1200° C. and contains less than 10 g./Nm.³ of free carbon. The amount of gas recycled with the oxygen containing gas may vary from 10 to 80%, or even more, by volume. At start up more than the stoichiometric amount of the oxygen containing gas, e.g. air, may be injected and the total amount of the gas at the burner head (i.e. the mixture containing the injected oxygen containing gas) may contain from 30 to 180% of the volume of oxygen containing gas required for stoichiometric combustion and start up may be carried out before recycling commences.

Suitable apparatus for carrying out the process of the invention consists of a combustion chamber provided with suitable atomizing means, itself of known type, a recycle path for the recycled portion of the gases which may be disposed within, or externally of, the gasifier means for the admission of the oxygen containing gas and means for circulating the recycled gases; suitably a fan or ejector is employed to assist circulation of the recycled gases. The apparatus may be made gas-tight so as to be capable of working at the selected pressure.

When the amount of recycled gas varies from 10 to 80% the following are typical percentage constituents of the resulting mixtures:

|  | Percent |
| --- | --- |
| $CO_2+SO_2$ | 8 to 2 |
| $O_2$ | 2 to 0 |
| $CO$ | 8 to 20 |
| $H_2$ | 0 to 8 |
| Gaseous hydrocarbons | 0 to 20 |
| $N_2$ | Remainder |

It will be understood that the above figures are not limiting ranges.

It will be appreciated that these percentages will vary according to the amount of oxygen containing gas injected into the recycled stream.

The quantity of unburnt liquid matter, e.g. tar, varies from 0 to 10 Nm.³ and that of carbon from 0 to 10 g./Nm.³.

The temperatures of the gases leaving the apparatus may vary from 500 to 1200° C., according to the operating conditions and the sensible heat of these gases can be used, in part, for preheating the oxygen containing gas admitted into the recycle stream.

The properties of the gaseous mixture produced may be varied by altering the proportion of oxygen containing gas admitted to the recycle stream or by changing the rate of recycling or both e.g. by reducing the amount of free oxygen containing gas admitted to the recycling gases to 10% of volume of that required for stoichiometric combustion or less, or by increasing the proportion of recycled gases to more than 80% by volume, or both. In addition, the gas mixture may be enriched with vaporizable combustible petroleum material which can be the same as that which is being gasified, or another petroleum fuel; the enriching petroleum material may also be a fuel gas much as butane or propane.

If desired, additional purification may be achieved by subjecting the gas mixture as produced to a further separation of entrained impurities by passing it through solids or liquid separating equipment such as filters, condensers or cyclone separators.

If desired for transportation of the gas mixture and/or further treatment, the gases emerging from the gasifier may be cooled, e.g. in a waste heat boiler or other equipment. This treatment permits recovery of sensible heat and also has the additional advantage that it serves to remove impurities such as tars; it also permits the separation of selected components.

Figure 3:
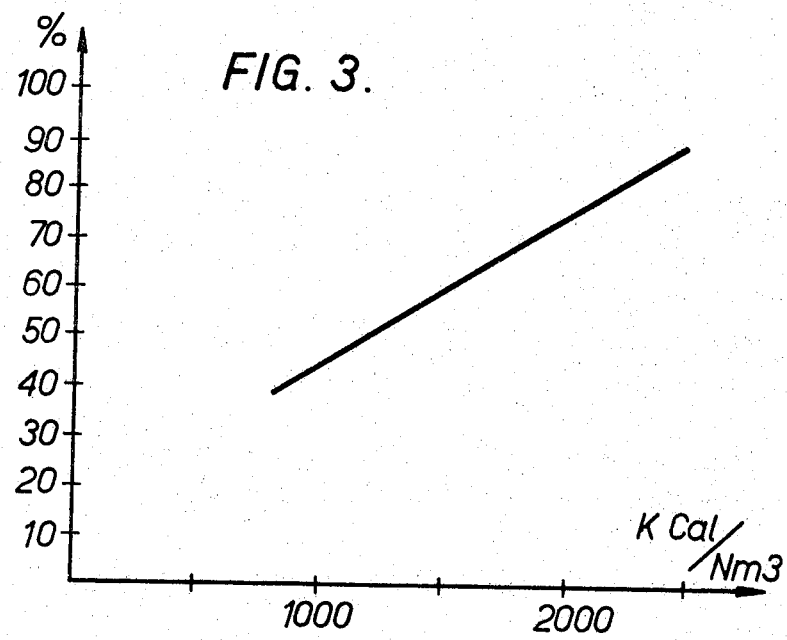
Figure 2:
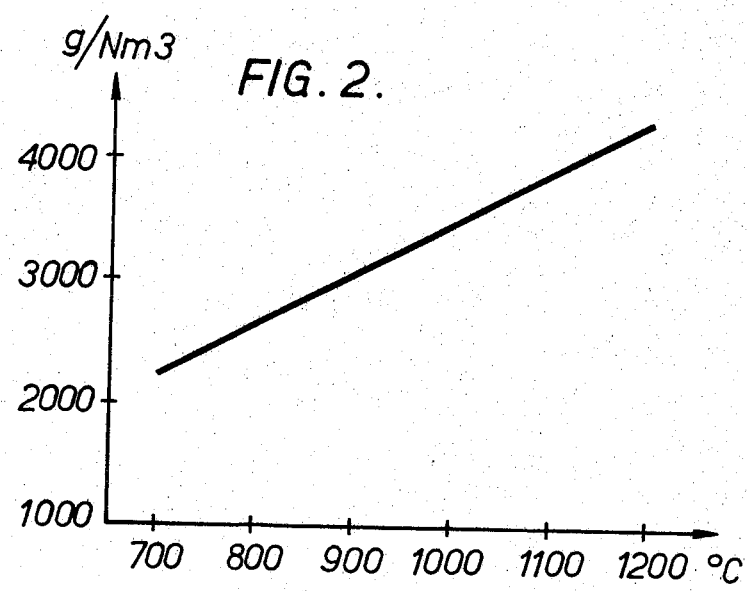

The invention is further illustrated by reference to the accompanying drawings in which:

FIGURE 1 shows, in simple form, in cross section, an apparatus suitable for converting hydrocarbons into combustible gas mixtures, FIGURE 2 shows the curve of a quantity of vaporizable petroleum product injectable into a gas mixture according to the initial temperature of the gas mixture, FIGURE 3 is a curve representing the gas yield as a function of the calorific value of the cooled gas, and FIGURE 4 shows, in diagrammatic form, a gasification device with combined control and distributing equipment.

Referring now to FIGURE 1 of the drawings, hydrocarbons are delivered through a delivery pipe 1 to an injector 2 where they are ignited by a flame at 2a and are gasified in a gasification chamber 3; the chamber 3 may be formed of refractory material 4 surrounded by insulating material 5 and lagging 6. Combustible gases pass through an outlet 7, a portion being tapped and recycled through a passage 8. Recycle gases passing through the passage 8 are drawn by a fan, or ejector, 11 into a passage 12 where they are mixed with free oxygen containing gas, usually air, injected through 10 and drawn into the chamber 12 by a fan 9. The chamber 12 is suitably lagged as shown at 13. The fan 9 is preferably arranged for variable delivery, for example in small units, for delivery of from 0 to 200 cubic metres per hour, standard pressure and temperature and with a variable delivery pressure of from 0 to 0.1 bar; as previously mentioned the oxygen containing gas may be injected at ambient temperature or preheated and, where the gas is air, it may be oxygen enriched. The fan 11 is also arranged for variable delivery, e.g. of from 0 to 50 cubic metres per hour at standard pressure and temperature. The mixture of recycled gases and injected free oxygen containing gas is returned to the gasification chamber 3 preferably entering near the atomizer 2.

As previously mentioned, the calorific value of the gaseous mixture may be increased by injecting a petroleum product which may be the same as the petroleum product that has been gasified. This is indicated by the graph of FIGURE 2 where the abscissae show the temperatures in °C. and the ordinates show quantities of vaporizable fuel oil in g./Nm.³. As shown on the graph, it is possible to vaporize large quantities of fuel without condensation as long as the final temperature of the mixture with the fuel gas remains above the dew point. The increase in heating power is in the region of 1000 kcal./Nm.³ per 100 g. of fuel oil injected. By injecting a petroleum product the temperature of the gaseous mixture is lowered; this is advantageous where the mixture is required to be transported over a distance. It is preferred to distribute the gas hot in lagged pipes.

Cooling of the gas mixture, when desired, can be effected at the outlet of the gasifier by suitable means such as a heat exchanger, or a waste heat boiler. The gasification yield will be clearly affected by such cooling. This yield, defined as the ratio between the latent heat of the gas (the product of the lower calorific value and the gas volume) and the latent heat of the initial fuel oil, will vary as a function of the calorific value of the cold gas as shown by the graph of FIGURE 3, where the abscissae denote the heating power of the cold gas in kcal./Nm.³ and the ordinates show the percentage gasification yield for the cooled gas.

Additional purification of hot gas emerging from the outlet of the gasifier may be carried out by any suitable known means of removing solids from gases such as a cyclone separator, an impact precipitator, or a filter. The gases may be cooled in a waste heat boiler. This treatment removes residual solid matter, particularly when a heavy fuel oil has been gasified. Furthermore, it enables mineral containing matter such as matter containing vanadium and sodium, which is present in the fuel oil, to be recovered. Vanadium has been found to be concentrated in the unburnt matter in the form of porphyrin compounds of molecular weight in the region of 2000. Simple calcining removes carbon and hydrogen leaving high vanadium content compounds; it has been found, for example, that about 100 g. of vanadium can be extracted from the gasification of one ton of fuel oil containing about 100 p.p.m. vanadium.

The invention also provides an improved apparatus for carrying out the method of the invention. One form of such apparatus is shown in, and has been described with reference to, FIGURE 1. A further form of apparatus is shown in FIGURE 4, wherein provision is made for the regulation of the proportion of oxygen containing gas injected to the recycle gas stream and of the delivery of the hydrocarbons to be gasified. Such regulation, which may be provided by suitable control devices, known per se, e.g. electronic or pneumatic control means, permits a constant ratio to be maintained and also permits desired variations of the ratios to be made. Generally, the delivery ratio of recycled gas does not require to be altered as long as there is no marked variation in delivery of the hydrocarbons being gasified. If the ratio alters significantly, e.g. above 1 to 3, then the provision of a suitable control will maintain the desired ratio.

Referring particularly to FIGURE 4, hydrocarbons are delivered through a delivery pipe 1 to a gasifier, e.g. as shown in FIGURE 1 and generally designated 31, provided with an outlet 7 and a gas recycling circuit 34 provided with an intake 35 for oxygen containing gas, e.g. air. Indicating means 36, for hydrocarbon delivery, and 37, for oxygen containing gas delivery, operate respective transmitters 38 and 39 to operate a differential analyser and control device 40 which actuates an air intake regulator 41 through a transmitter 42. A similar device regulates the ratio of hydrocarbon to the recycled gases, an analyser and control device 43 receiving instructions concerning the delivery of hydrocarbon from indicating means 36 and recycled gases from an indicating means 44 through transmitters 45 and 46 respectively, and operating through a transmitter 47 on the intake of recycled gases through a regulating device 48. The recycled gases and air are circulated by fans or other driving means 49 and 50 respectively. If desired a cooling and/or a solids removing device 51 may be included in the outlet 7; an injection inlet 52 may also be provided.

It will be appreciated that it is also possible to regulate the operation of the gasifier so as to vary characteristics of the flame obtained when burning the gaseous mixture produced in the gasifier.

Such characteristics include the shape and combustion intensity of the flame and its nature, i.e. whether it is oxidizing, reducing or neutral. The calorific value of the gas, and its hydrocarbon content, are functions of the ratio of air delivery to hydrocarbon delivery to the gasifier. By varying this ratio the gaseous mixture obtained will contain a varying amount of hydrocarbon so that, by increasing the proportion of hydrocarbons, the luminosity of the combustion flame will be increased. In order to alter the flame characteristics at will, without risk of burning the gas with lack of air, a single fan or blower may be used to operate the air feed to both the gasifier and the burner, and arranged to supply the apparatus i.e. the gasifier and the burner with at least the required stoichiometric amount of air to burn the fuel oil; to alter the characteristics of the gas burner flame it is sufficient to arrange a suitable distribution of the air delivery between the gasifier and the burner. For example, an increase in the ratio of air delivered to the gasifier will entail a decrease in the emissive power of the gas flame.

The invention provides a very flexible means of controlling the combustible gas atmosphere and permits inexpensive materials such as gas oil and heavy fuel oil to be employed in producing the combustible gases, so that oxidizing, neutral or reducing gas atmospheres may be provided, thus making it possible to provide the required conditions according to the intended use of the gases produced by the gasifier; that is their use in various industries, e.g. in the ceramics industry or in non-ferrous metallurgy. In previous methods it has been necessary to use costly sources of combustible gas such as town gas, or a high calorific value gas, e.g. propane.

A further example of the application of the invention is in the firing of boilers. When liquid hydrocarbon fuels, such as a residual fuel oil, are used to directly fire a boiler, combustion has to be carried out with a large excess of air to avoid excessive carbon formation which is detrimental to the boiler operation and also gives rise to atmospheric pollution. The employment of excess air involves serious disadvantages such as the formation of corrosive oxides of sulphur, from the sulphur present in the fuel oil, the formation of smuts, and the production of vanadium pentoxide which fuses and forms corrosive deposits in the boiler at the temperatures of operation; furthermore, because of the large volumes of gases required in this mode of boiler firing, inefficient operation results. On the other hand the present invention enables a clean gas to be provided, even when derived from a heavy fuel oil, which can be fired with an overall low excess of air and which does not give rise to the abovementioned disadvantages.

A further application of the invention is for the provision of combustible gases for gas turbines starting from a liquid hydrocarbon fuel, e.g. a heavy residual fuel oil. The gas mixture produced by the gasifier, which may be further purified by removing not only carbon, but also vanadium and sodium as previously described, may be cooled, compressed and fed to the gas turbine; the purified gas mixture will reduce fouling and corrosion of the turbine vanes.

The invention is further illustrated by reference to the following examples:

EXAMPLE I

The invention provides for the ready conversion of relatively heavy hydrocarbon fuel oils to gaseous fuels using simple gasification equipment as shown by the data in Table I which are referable tests carried out on a gas oil and on a residual fuel oil respectively.

Gas oil:
  Density: 0.84
  Flash point in a closed vessel: 78° C.
  Viscosity: 4 centistokes at 20° C.
  Cetane No.: 50
  Sulphur content: 0.5%
  ASTM distillation: Initial boiling point, 160° C.
  30% distilled at 250° C.
  Final boiling point: 360° C.
Residual fuel oil:
  Viscosity: 342 centistokes at 50° C.
  Sulphur content: 3%
  Water and sediment: 0.1%
  ASTM distillation: Initial boiling point 160° C.
  Percent distilled at 270° C.: 10

The results obtained are shown in the following table:

TABLE I

| Fuel Charge | Gas Oil With recycle | | Residual Fuel Oil With recycle | | Without recycle |
|---|---|---|---|---|---|
| Fuel Delivery kg./hour | 13.8 | 14.2 | 13.8 | 13.8 | 13.8 |
| Volume of air per kg. hydrocarbon fuel, $Nm.^3$ | 3.9 | 3.7 | 3.5 | 3.7 | 3.7 |
| Volume of recycled gas per kg. fuel, $Nm.^3$ | 3 | 2.2 | 2.3 | 3.2 | 0 |
| Temperature of gas leaving the gasifier, ° C. | 700 | 650 | 750 | 650 | 1,135 |
| Composition of gas, percent volume: | | | | | |
| $CO_2 + SO_2$ | 3.5 | 3.6 | 6 | 4.4 | 5 |
| $O_2$ | 0.5 | 0.8 | 0.4 | 0.4 | 0 |
| $CO$ | 18.2 | 15.6 | 15.6 | 17.6 | 13.2 |
| $H_2$ | 4.65 | 3.45 | 5.39 | 4.52 | 15 |
| Hydrocarbons: | | | | | |
| $C_1$ | 6.41 | 6.59 | 6.06 | 6.53 | 1.2 |
| $C_2$ | 1.60 | 3.38 | 2.92 | 2.13 | 0 |
| $C_3$ | 0.04 | 0.26 | 0.7 | 0.5 | 0 |
| $C_4$ | 0.07 | 0.11 | 0.04 | 0.04 | 0 |
| $C_{5+}$ | 0.24 | 0.27 | 0.34 | 0.28 | 0 |
| Volume of gas obtained per kg. fuel $Nm.^3$ | 4.8 | 4.5 | 4.4 | 4.6 | 5 |
| Lower calorific value of gas kcal./$Nm.^3$ (Gas+unburnt material) | 1,560 | 1,830 | 1,720 | 1,670 | 1,580 |
| Sensible heat of the gas kcal./$Nm.^3$ | 230 | 215 | 245 | 215 | 565 |
| Unburnt solids, g./kg. fuel | 0 | 0 | 17 | 5.5 | 390 |
| Unburnt liquids, g./kg. fuel | 7 | 11 | 11 | 4.5 | 0 |

EXAMPLE II

In an apparatus provided with gas recycle means in accordance with the invention, tests were performed with a heating fuel oil having the following characteristics:

Density: 0.84
Flash point, closed vessel: 78° C.
Viscosity at 20° C.: 4 centistokes
Cetane No.: 50
Sulphur content: 0.5%
ASTM distillation—
  Initial boiling point: 160° C.
  Percent distilled at 250° C.: 40
  Final boiling point: 360° C.

The results obtained are given in the following table:

TABLE II

| | | | |
|---|---|---|---|
| Fuel oil delivery, kg./hour | 40 | 65 | 58 |
| Volume of air per kg./fuel, $Nm.^3$ | 2.35 | 1.83 | 1.53 |
| Percent injected air in relation to stoichiometric combustion | 20 | 16 | 13 |
| Volume of gas recycled per kg. fuel oil: $Nm^3$ | 5.5 | 4.3 | 2.8 |
| Percent of recycle gas in the combustion gas | 70 | 70 | 65 |
| Temperature of gas at exit, ° C. | 870 | 825 | 750 |
| Composition of gas (percent by volume): | | | |
| $CO_2 + SO_2$ | 4.8 | 4.8 | 5.4 |
| $O_2$ | 2.6 | 3.6 | 2.8 |
| $CO$ | 15.4 | 11.6 | 10.8 |
| $H_2$ | 1.8 | 1.2 | 1.0 |
| Hydrocarbons: | | | |
| $C_1$ | 4.9 | 3.5 | 2.8 |
| $C_2$ | 5.1 | 4.6 | 3.8 |
| $C_3$ | 1.4 | 1.9 | 1.6 |
| $C_4$ | 0.8 | 1.0 | 0.9 |
| $C_5$ | 0.3 | 0.5 | 0.5 |
| $C_6$ | 0.1 | 0.3 | 0.3 |
| Benzene | 0.15 | 0.1 | 0.1 |
| Volume of gas per kg. of fuel oil: $Nm.^3$ | 2.95 | 2.12 | 1.73 |
| Lower calorific value of gas kcal./$Nm.^3$ | 3.160 | 4.535 | 5.520 |
| Sensible heat of the gas kcal./$Nm.^3$, ° C. | 280 | 260 | 250 |
| Unburnt solids g./$Nm.^3$ | 0 | 0 | 0 |
| Gasification yield percent hot gas: fuel feed | 91 | 93 | 93.8 |
| Condensible hydrocarbon at 10° C., g./$Nm.^3$ | 50 | 200 | 330 |
| Condensible hydrocarbons at 10° C., percent of initial fuel | 15 | 42 | 57 |
| Dew point temperature, ° C. | 195 | 230 | 250 |

EXAMPLE III

Using the same apparatus as in Example 1, tests were performed with a light naphtha having the following characteristics:

ASTM distillation—
  Initial boiling point _____ ° C __ 35
  Final boiling point _____ ° C __ 90

Composition:
  $C_3$ _____ Percent by weight __ 0.03
  $C_4$ _____ do ___ 3.7
  $C_5$ _____ do ___ 43.5
  $C_6$ _____ do ___ 45.1
  Benzene _____ do ___ 1.1
  $C_7$ _____ do ___ 6.6

The results obtained are given in Table III.

TABLE III

| | | | |
|---|---|---|---|
| Naphtha delivery, kg./hour | 32 | 32 | 32 |
| Volume of air per kg. naphtha, $Nm.^3$ | 1.65 | 1.30 | 1.25 |
| Percent injected air in relation to stoichiometric combustion | 14 | 11 | 10 |
| Volume of recycle gas per kg. of naphtha: $Nm.^3$ | 3.85 | 8 | 5.7 |
| Percent of recycle gas in combustion gas | 70 | 86 | 82 |
| Temperature of exit gas, °C | 670 | 550 | 470 |
| Composition of exit gas, percent by volume: | | | |
| $CO_2 + SO_2$ | 4.4 | 4.7 | 3.6 |
| $O_2$ | 2 | 3 | 6 |
| CO | 16.4 | 10 | 8.2 |
| $H_2$ | 2.4 | 1.5 | 1.1 |
| Hydrocarbons: | | | |
| $C_1$ | 3.97 | 1.41 | 1.09 |
| $C_2$ | 6.26 | 2.31 | 1.63 |
| $C_3$ | 2.56 | 1.70 | 1.40 |
| $C_4$ | 2.74 | 1.81 | 1.97 |
| $C_5$ | 1.56 | 6.79 | 6.43 |
| $C_6$ | 0.76 | 4.56 | 5.78 |
| Benzene | 0.13 | 0.08 | 0.09 |
| $C_7$ | 0 | 0.15 | 0.17 |
| Volume of gas per kg. of naphtha: $Nm.^3$ | 2.28 | 1.65 | 1.60 |
| Lower calorific value of gas kcal./$Nm.^3$ | 4.160 | 6.365 | 6.400 |
| Sensible heat kcal./$Nm.^3$ | 220 | 180 | 165 |
| Unburnt solids, g./$Nm.^3$ | 0 | 0 | 0 |
| Gasification yield: | | | |
| Percent hot gas: fuel feed | 93.5 | 99 | 97.5 |
| Percent cold gas: fuel feed | 89 | 97 | 94 |
| Hydrcarbons condensed at 10° C., g./$Nm.^3$ | 0 | 0 | 0 |
| Condensible hydrocarbons, percent initial naphtha | 0 | 0 | 0 |

It will be seen from the foregoing example that by feeding the gasifier with a light distillate, a gas mixture is obtained free of unburnt residues, having a high heat content and which can be cooled to ambient temperature without condensation.

What is claimed is:

1. A process for the production of a combustible gas mixture having less than 10 grams of carbon per cubic meter of gas and being free of condensible materials at standard temperature and pressure and having a heating value ranging from 800 to 3,000K calories per cubic meter, consisting essentially of continuously injecting a liquid hydrocarbon fuel into a gasification zone, partially combusting the fuel therein with less than stoichiometric amounts of oxygen in a free oxygen-containing gas, continually withdrawing the gaseous products of said partial combustion, recovering a portion of the withdrawn products as a combustible gas mixture and recycling another portion back to said gasification zone near the point of injection of said liquid hydrocarbon fuel, the free oxygen-containing gas for the reaction with the liquid hydrocarbon fuel being introduced into said recycle portion of the withdrawn gaseous products prior to introducing said recycle portion into the gasification zone.

2. The process of claim 1 wherein said liquid hydrocarbon fuel is a residual fuel oil.

3. The process of claim 1 wherein the oxygen-containing gas introduced into said recycling portion of the combustible gas is air.

4. The process of claim 1 wherein from 10 to 80% by volume of said withdrawn gaseous products are recycled back to the gasification zone.

5. The process of claim 1 wherein more than 80% by volume of said withdrawn gaseous products are recycled to the gasification zone, whereby the recovered products comprise an enriched combustible gas mixture.

6. The process of claim 1 wherein the combined volume of said recycle portion and said oxygen-containing gas is from 30 to 180% of the stoichiometric volume of oxygen-containing gas required for complete combustion.

7. The process of claim 1 wherein enrichment of the combustible gas mixture is obtained by increasing the ratio of fuel to oxygen-containing gas.

8. The process of claim 7 wherein the proportion of oxygen-containing gas is not more than 10% by volume of the stoichiometric amount required for complete combustion.

9. The process of claim 1 wherein the gaseous mixture produced in the gasifier is enriched by the injection of hydrocarbons.

References Cited

UNITED STATES PATENTS

| | | | |
|---|---|---|---|
| 2,206,189 | 7/1940 | Hillhouse | 48—93 XR |
| 2,757,129 | 7/1956 | Reeves et al. | 201—37 XR |
| 1,905,028 | 4/1933 | Andrews et al. | |
| 2,478,682 | 8/1949 | Blackwood | 123—119 XR |
| 3,019,096 | 1/1962 | Milbourne | 48—213 |
| 3,318,798 | 5/1967 | Kondis et al. | 201—37 XR |
| 2,695,836 | 11/1954 | Gilmore | 23—3 |
| 3,168,386 | 2/1965 | Moritz et al. | 48—212 |
| 2,660,521 | 11/1953 | Teichmann | 48—213 XR |

MORRIS O. WOLK, Primary Examiner.

J. D. OLSEN, Assistant Examiner.

U.S. Cl. X.R.

23—281; 48—93, 107, 213; 201—37